US010644756B2

(12) United States Patent
Hueber et al.

(10) Patent No.: US 10,644,756 B2
(45) Date of Patent: May 5, 2020

(54) TRANSMITTER CALIBRATION FOR NFC (NEAR FIELD COMMUNICATION) DEVICE

(71) Applicant: NXP B.V., Eindhoven (NL)

(72) Inventors: Gernot Hueber, Linz (AT); Ian Thomas Macnamara, Graz (AT)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/049,436

(22) Filed: Jul. 30, 2018

(65) Prior Publication Data

US 2020/0036412 A1     Jan. 30, 2020

(51) Int. Cl.
*H04B 17/11* (2015.01)
*H04B 5/00* (2006.01)
*H04B 17/12* (2015.01)
*H04B 5/02* (2006.01)

(52) U.S. Cl.
CPC ............ *H04B 5/0075* (2013.01); *H04B 5/02* (2013.01); *H04B 17/12* (2015.01)

(58) Field of Classification Search
CPC ..................................................... H04B 17/11
See application file for complete search history.

(56) References Cited

U.S. PATENT DOCUMENTS

| | | | |
|---|---|---|---|
| 6,556,814 B1* | 4/2003 | Klomsdorf | H03F 1/565 455/121 |
| 8,373,403 B1* | 2/2013 | Radovic | H02M 3/1588 323/284 |
| 8,638,838 B1* | 1/2014 | Betts | H04L 5/16 326/30 |
| 9,515,750 B2 | 12/2016 | Mofidi et al. | |
| 9,756,578 B2 | 9/2017 | Wong et al. | |
| 9,960,791 B2* | 5/2018 | Desclos | H04B 1/18 |
| 2005/0057981 A1* | 3/2005 | Yoo | G11C 7/1051 365/202 |
| 2008/0055401 A1* | 3/2008 | DeCusatis | G02B 27/00 348/53 |
| 2012/0075016 A1* | 3/2012 | Visser | H03F 1/56 330/116 |
| 2012/0119792 A1* | 5/2012 | Wang | H04L 25/0278 327/108 |
| 2013/0005278 A1* | 1/2013 | Black | H01Q 1/241 455/77 |
| 2013/0226496 A1* | 8/2013 | Gudem | G01R 31/3191 702/107 |

(Continued)

FOREIGN PATENT DOCUMENTS

EP    3319239 A1    5/2018

*Primary Examiner* — Cindy Trandai

(57) ABSTRACT

This specification discloses methods and systems for controlling a NFC (near field communication) transmitter output with enhanced accuracy. This is achieved by first doing a device and/or system level calibration of the Tx (transmitter) by testing at the device and/or system level. Then using the testing results to generate a set of Tx calibration data, which will be used by a Tx control unit to control the Tx outputs (such as Tx output power, Tx output voltage, Tx output current, etc.) with enhanced accuracy. In some embodiments, the Tx control unit controls the Tx output with enhanced accuracy by using the Tx calibration data to tune one or more of the following: (i) Tx supply, (ii) Tx driver, (iii) matching network.

20 Claims, 7 Drawing Sheets

(56) References Cited

U.S. PATENT DOCUMENTS

| | | | | |
|---|---|---|---|---|
| 2014/0080409 A1* | 3/2014 | Frankland | ............... | H02J 5/005 455/41.1 |
| 2014/0159508 A1* | 6/2014 | Sankar | ................... | H02J 17/00 307/149 |
| 2014/0273830 A1* | 9/2014 | Wong | ................... | H04B 5/0031 455/41.1 |
| 2014/0353300 A1* | 12/2014 | Swiatek | ............... | H05B 1/0272 219/211 |
| 2014/0378188 A1* | 12/2014 | Liu | ................... | H04W 52/0261 455/574 |
| 2015/0249354 A1* | 9/2015 | Lim | ..................... | H02J 7/0052 307/1 |
| 2015/0270876 A1* | 9/2015 | Kim | ..................... | H04B 5/0081 455/41.1 |
| 2015/0358038 A1* | 12/2015 | Koskinen | ............. | H04B 1/0475 375/297 |
| 2015/0381163 A1* | 12/2015 | Green | ................. | H03K 17/162 327/387 |
| 2016/0064952 A1* | 3/2016 | Matsumoto | ............ | H01F 38/14 307/104 |
| 2016/0120144 A1* | 5/2016 | Kim | ..................... | A01K 1/0047 119/437 |
| 2016/0134382 A1 | 5/2016 | Mofidi et al. | | |
| 2017/0030978 A1* | 2/2017 | Choi | ......................... | H02J 3/01 |
| 2018/0034510 A1 | 2/2018 | Hueber et al. | | |

\* cited by examiner

500A

| Input | Setting | | |
|---|---|---|---|
| Target Tx Power (mW) | Tx Supply HW Config | PWM (%) | Num Driver |
| 0.3 | 0 | 10 | 1 |
| 1.0 | 0 | 20 | 1 |
| 2.3 | 0 | 30 | 1 |
| 4.0 | 0 | 40 | 1 |
| 6.3 | 0 | 50 | 1 |
| 9.0 | 0 | 60 | 1 |
| 12.3 | 0 | 70 | 1 |
| 16.0 | 0 | 80 | 1 |
| 20.3 | 0 | 90 | 1 |
| 25.0 | 0 | 100 | 1 |
| 36.0 | 0 | 60 | 2 |
| 49.0 | 0 | 70 | 2 |
| 56.3 | 8 | 50 | 1 |
| 64.0 | 0 | 80 | 2 |
| 81.0 | 0 | 90 | 2 |
| 100.0 | 0 | 100 | 2 |
| 110.3 | 8 | 70 | 1 |
| 144.0 | 4 | 60 | 2 |
| 182.3 | 8 | 90 | 1 |
| 196.0 | 4 | 70 | 2 |
| 225.0 | 8 | 100 | 1 |
| 256.0 | 4 | 80 | 2 |
| 324.0 | 4 | 90 | 2 |
| 400.0 | 4 | 100 | 2 |
| 441.0 | 8 | 70 | 2 |
| 576.0 | 8 | 80 | 2 |
| 729.0 | 8 | 90 | 2 |
| 784.0 | 12 | 70 | 2 |
| 900.0 | 8 | 100 | 2 |
| 1024.0 | 12 | 80 | 2 |
| 1296.0 | 12 | 90 | 2 |
| 1600.0 | 12 | 100 | 2 |

| Input | Setting | | |
|---|---|---|---|
| Target Tx Power (mW) | Tx Supply HW Config | PWM (%) | Num Driver |
| TxPwr1 | TxCfg1 | PWM1 | NumDrv1 |
| TxPwr2 | TxCfg2 | PWM2 | NumDrv1 |
| TxPwr3 | TxCfg3 | PWM3 | NumDrv1 |
| TxPwr4 | TxCfg4 | PWM1 | NumDrv2 |
| TxPwr5 | TxCfg5 | PWM2 | NumDrv2 |
| TxPwr6 | TxCfg6 | PWM3 | NumDrv2 |
| TxPwr7 | TxCfg1 | PWM1 | NumDrv1 |
| TxPwr8 | TxCfg2 | PWM2 | NumDrv1 |
| TxPwr9 | TxCfg3 | PWM3 | NumDrv1 |
| TxPwr10 | TxCfg4 | PWM1 | NumDrv2 |
| TxPwr11 | TxCfg5 | PWM2 | NumDrv2 |
| TxPwr12 | TxCfg6 | PWM3 | NumDrv2 |

| Tx Supply HW Config | Tx Supply Voltage |
|---|---|
| 0 | 1 |
| 1 | 1.25 |
| 2 | 1.5 |
| 3 | 1.75 |
| 4 | 2 |
| 5 | 2.25 |
| 6 | 2.5 |
| 7 | 2.75 |
| 8 | 3 |
| 9 | 3.25 |
| 10 | 3.5 |
| 11 | 3.75 |
| 12 | 4 |
| 13 | 4.25 |
| 14 | 4.5 |
| 15 | 4.75 |
| 16 | 5 |

FIG. 5C

TRANSMITTER CALIBRATION FOR NFC (NEAR FIELD COMMUNICATION) DEVICE

FIELD

The described embodiments relate generally to methods and devices that provide for communication via inductive coupling, and more particularly to methods and devices that provide for communication via inductive coupling with calibration data that enables the transmitters to control the transmitter output with enhanced accuracy.

BACKGROUND

An NFC (Near Field Communication) enabled device is an example of a communications device that communicates via inductive coupling. NFC is a short-range wireless technology that allows communication between NFC enabled objects over a distance of less than 10 cm. NFC is based on Radio Frequency Identification (RFID) standards. It is a technology that is designed to make an easier and more convenient world for us, enhancing the way we make transactions, exchange content and connect devices. The NFC tags one might see or create include contacts, URLs, map locations, text and much more.

An NFC-enabled device can operate in various operating modes, such as reader/writer mode, card emulation mode, and peer-to-peer mode. For example, an NFC-enabled device in reader/writer mode can behave like a simple contactless card reader. It initiates communication by generating a magnetic field and then sending a command to the target. The target responds to the interrogator by retro-reflecting the incident wave. The specificity of NFC operating modes is that the target can be not only a tag or a contactless card, but also an NFC-enabled device that behaves like a contactless card (in card emulation mode). Usages of reader mode, for example, include information reading, when an NFC-enabled device is used to read data by waving it in front of electronic labels available on streets, bus stops, sightseeing monuments, ad banners, parcels, products or on business cards (vCard). But there are many other possible use cases.

As another example, an NFC-enabled device in card emulation mode can allow the NFC-enabled device to act like smart cards, allowing users to perform transactions such as purchases, ticketing, and transit access control with just a touch. An NFC-enabled device in card emulation mode can be configured for either passive load modulation (PLM) or active load modulation (ALM). While, ALM is typically more complex than PLM, components for implementing ALM in a card-mode device (e.g., a mobile device) can be more compact and, because the card-mode device utilizes a power source to generate a magnetic field rather than just modulate a magnetic field created by a reader, an ALM card-mode device can have greater communications range than a PLM card-mode device.

As a further example, peer-to-peer mode enables two NFC-enabled devices to communicate with each other to exchange information and share files, so that users of NFC-enabled devices can quickly share contact information and other files with a touch.

In all these modes and other possible applications, where an NFC-enabled device is transmitting signal, it can be important to have an accurate transmitter output. As such, there are strong motivations to control the transmitter output with enhanced accuracy.

SUMMARY

This specification discloses methods and systems for controlling a NFC (near field communication) transmitter output with enhanced accuracy. This is achieved by first generating a set of Tx (transmitter) calibration data by testing/calibrating a NFC Tx (transmitter) at a device and/or system level. Then, in some embodiments, this set of Tx calibration data can be used by a Tx control unit to control the Tx outputs (such as Tx output power, Tx output voltage, Tx output current, etc.) with enhanced accuracy. In some embodiments, the Tx control unit controls the Tx output with enhanced accuracy by using the Tx calibration data to tune one or more of the following: (i) a Tx supply, (ii) a Tx driver, (iii) a matching network.

The present invention provides for a device that communicates via inductive coupling, the device comprising: (a) a matching network; (b) an antenna; (c) a Tx (transmitter) unit, the Tx unit configured to generate a transmitted signal that is transmitted through the matching network and the antenna; (d) a Tx (transmitter) control unit, the Tx control unit configured to controlling a Tx output using Tx calibration data, (i) wherein the Tx calibration data is generated by testing at a device level and/or a system level, (ii) wherein the Tx calibration data enables the Tx control unit to control the Tx output with enhanced accuracy.

In some embodiments, the Tx output is a Tx output power level.

In some embodiments, the Tx output is a Tx output voltage level.

In some embodiments, the Tx output is a Tx output current level.

In some embodiments, the device further comprises: (e) a Rx (receiver) unit, the receiver unit configured to receive a signal from a counterpart device.

In some embodiments, the device is an NFC-enabled device operating in one of the following modes: (a) reader/writer mode, (b) card mode with ALM (active load modulation), (c) peer-to-peer mode, wherein NFC stands for near field communication.

In some embodiments, (a) the Tx unit is comprised of: (i) a Tx supply, (ii) a Tx driver, (b) wherein the Tx control unit controls the Tx output with enhanced accuracy by using the Tx calibration data to tune one or more of the following: (i) the Tx supply, (ii) the Tx driver, (iii) the matching network.

In some embodiments, (a) the Tx unit is comprised of: (i) a Tx supply, (ii) a Tx driver, (b) wherein the Tx control unit controls the Tx output with enhanced accuracy by using the Tx calibration data to tune one or more of the following: (i) tuning a setting of the Tx supply, (ii) tuning a pulse modulation of the Tx driver, (iii) tuning an impedance of Tx driver transistors, (iv) tuning a biasing of the Tx driver, (v) tuning a number of drivers turned on, (vi) tuning the matching network.

In some embodiments, tuning the matching network comprises: changing an impedance setting of the matching network.

In some embodiments, control of the Tx output with enhanced accuracy is achieved with reference to one or more of the following: (a) a Tx power that is radiated from the device, (b) a Tx field strength that is radiated from the device, (c) a Tx output voltage that is fed to the matching network, (d) a voltage on any node in the matching network, (e) an antenna voltage, (f) a Rx input voltage.

In some embodiments, the Tx control unit is one of the following: (a) a hardware functional block, (b) a software functional block, (c) a functional block comprising both hardware and software.

In some embodiments, the Tx calibration data is stored as one of the following: (a) a plurality of configuration parameter datasets to be applied to the device to achieve specific Tx output per available Tx output settings in a table, (b) a plurality of configuration parameter datasets to be applied to the device to achieve specific Tx output per available Tx output settings in a function.

In some embodiments, each configuration parameter dataset is comprised of one or more of the following parameters: (a) Tx supply voltage, (b) pulse modulation of a Tx signal, (c) Tx impedance, (d) number of Tx drivers turned on, (e) impedance setting of the matching network.

In some embodiments, the Tx control unit is implemented as one of the following: (a) a look-up table comprising the Tx calibration data, (b) a function comprising the Tx calibration data, (c) a combination of a look-up table and a function, the combination comprising the Tx calibration data.

The present invention also provides for a method for operating a device that communicates via inductive coupling, the method comprising: (a) generating, by a Tx (transmitter) unit of the device, a transmitted signal; (b) controlling, by a Tx (transmitter) control unit of the device, a Tx output using Tx calibration data, wherein the Tx calibration data is generated by testing at a device level and/or a system level, wherein the Tx calibration data enables the Tx control unit to control the Tx output with enhanced accuracy; (c) transmitting, by a matching network unit and an antenna of the device, the transmitted signal.

In some embodiments, the Tx output is one of the following: (a) a Tx output power level, (b) a Tx output voltage level, (c) a Tx output current level.

In some embodiments, the method further comprising: (d) receiving, by a Rx (receiver) unit of the device, a response from a counterpart device.

In some embodiments, (a) the Tx unit is comprised of: (i) a Tx supply, (ii) a Tx driver, (b) wherein the step of controlling the Tx output using the Tx calibration data is comprised of the Tx control unit controlling the Tx output with enhanced accuracy by using the Tx calibration data to tune one or more of the following: (i) the Tx supply of the device, (ii) the Tx driver of the device, (iii) the matching network of the device.

In some embodiments, (a) the Tx unit is comprised of: (i) a Tx supply, (ii) a Tx driver, (b) wherein the step of controlling the Tx output using the Tx calibration data is comprised of the Tx control unit controlling the Tx output with enhanced accuracy by using the Tx calibration data to tune one or more of the following: (i) tuning a setting of the Tx supply, (ii) tuning a pulse modulation of the Tx driver, (iii) tuning an impedance of Tx driver transistors, (iv) tuning a biasing of the Tx driver, (v) tuning a number of drivers turned on, (vi) tuning the matching network.

The present invention provides for a computer program product comprising executable instructions encoded in a non-transitory computer readable medium which, when executed by a system, carry out or control the following method for operating a device that communicates via inductive coupling, the method comprising: (a) generating, by a Tx (transmitter) unit of the device, a transmitted signal; (b) controlling, by a Tx (transmitter) control unit of the device, a Tx output using Tx calibration data, wherein the Tx calibration data is generated by testing at a device level and/or a system level, wherein the Tx calibration data enables the Tx control unit to control the Tx output with enhanced accuracy; (c) transmitting, by a matching network unit and an antenna of the device, the transmitted signal.

The above summary is not intended to represent every example embodiment within the scope of the current or future Claim sets. Additional example embodiments are discussed within the Figures and Detailed Description below. Other aspects and advantages of embodiments of the present invention will become apparent from the following detailed description taken in conjunction with the accompanying drawings.

BRIEF DESCRIPTION OF THE DRAWINGS

FIG. 5A shows an example look-up table comprising Tx (transmitter) calibration data (i.e., parameter settings) that that can be used to help control a target Tx output (e.g., a target Tx output power) with enhanced accuracy in accordance with some embodiments of the invention.

FIG. 5B shows an example generic look-up table comprising Tx (transmitter) calibration data (i.e., parameter settings) that can help control a target Tx output (e.g., a target Tx output power) with enhanced accuracy in accordance with some embodiments of the invention.

FIG. 5C shows an example linking table, which links Tx supply hardware configuration setting with actual Tx supply voltage, in accordance with some embodiments of the invention.

DETAILED DESCRIPTION

Figure 1:
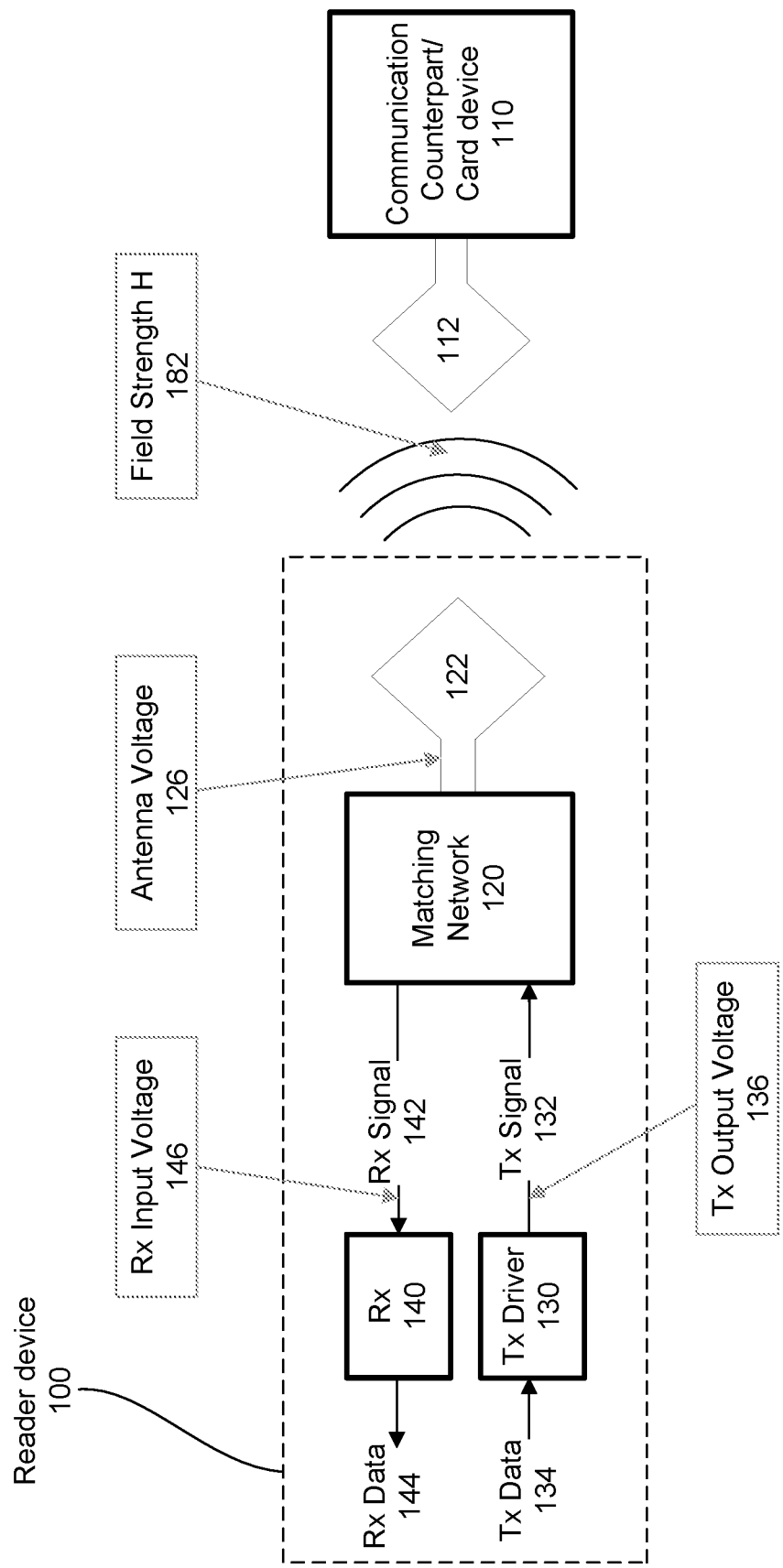
FIG. 1 shows a functional block diagram of a reader device and a card (tag) device with relevant signal nodes highlighted in accordance with some embodiments of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

This specification discloses methods and systems for controlling a NFC (near field communication) transmitter output with enhanced accuracy. This is achieved by first doing a device and/or system level calibration of the Tx (transmitter) by testing at the device and/or system level. Then using the testing results to generate a set of Tx calibration data, which will be used by a Tx control unit to control the Tx outputs (such as Tx output power, Tx output voltage, Tx output current, etc.) with enhanced accuracy. In some embodiments, the Tx control unit controls the Tx output with enhanced accuracy by using the Tx calibration data to tune one or more of the following: (i) a Tx supply, (ii) a Tx driver, (iii) a matching network.

An NFC-enabled device can use the NFC Tx (transmitter) when a NFC controller is in active mode (i.e., reader mode or card mode ALM). Therefore, this specification discloses methods and systems to calibrate the Tx (transmitter) output (e.g., output power, output voltage, output current) of a NFC (Near Field Communication) controller in active mode (i.e., reader mode or card mode ALM). One important point of this disclosure is that the calibration can be referenced to Tx output voltage (chip output), voltage at the antenna node (Vant), or even field strength of the radiated signal from the NFC-enabled device (with the latter two including the matching network), as well as other possible nodes so that the Tx output can be controlled with enhanced accuracy.

In NFC-enabled systems, for both reader-mode and card-mode active load modulation (ALM), an accurate transmit power is important for controlling consistent performance over volume population, as well as when control of output power is needed (e.g., card-mode ALM). As the transmit power emitted at the antenna is driven by a voltage applied to the antenna, the accuracy requirement can also apply to the voltage at the antenna, which in turn is induced by the voltage at the Tx output, as well as the output (e.g., Tx output power, Tx output voltage, Tx output current, etc.) at other nodes.

A second application of this disclosure is the loopback feature, where an NFC-enabled device's own Tx driver can be used as a signal generator to provide accurate reference test signals for (production) testing purposes, with the motivation to replace bulky, costly, slow (in control of signal output) external test equipment (such as signal generator) by an accurate feature of a DUT (device under test) itself. In other embodiments, where the Tx driver is used solely as a signal generator to provide accurate reference test signals for (production) testing purposes, it is possible to have a device with only a transmitter (i.e., no receiver is needed in the device, so the device only includes a transmitter).

FIG. 1 shows a functional block diagram of a reader device 100 and a card (tag) device 110 with relevant signal nodes highlighted in accordance with some embodiments of the invention. In FIG. 1, the reader device 100 is shown to include a Tx (transmitter) driver 130, a Rx (receiver) 140, a matching network 120, and an antenna 122. In general, a reader device can include a Tx (transmitter) unit (which can further include a Tx driver, Tx supply, etc.), a Rx (receiver) unit, a matching network, and an antenna. FIG. 1 shows that the Tx driver 130 receives Tx data 134 as input, and then transmits Tx signal 132 as output. FIG. 1 also shows that the Rx 140 receives Rx data 142 as input, and then transmits Rx data 144 as output.

FIG. 1 also shows a communication counterpart card device 110 together with an antenna 112. In some embodiments, the reader device 100 can initiate communication by generating a magnetic field and then sending a command to the target card device 110. The target card device can respond to the interrogator by retro-reflecting the incident wave together with load modulation.

FIG. 1 is shown with a receiver 140, but, in some embodiments, where the Tx driver is used as a signal generator to provide accurate reference test signals for (production) testing purposes, it is possible to have a device with only a transmitter and a Tx (transmitter) control unit, since no receiver is needed in the device. The receiver is only needed, if the device needs to receive a signal. Therefore, in some embodiments, a device (that communicates via inductive coupling and is enhanced with Tx calibration that enables a Tx to control the Tx output with enhanced accuracy) can be comprising only a Tx (transmitter) and a Tx (transmitter) control unit, wherein the Tx calibration data is generated by testing at a device level and/or a system level, wherein the Tx calibration data enables the Tx control unit to control the Tx output with enhanced accuracy. In other words, this means that (a) a matching network, (b) an antenna, and (c) a receiver can all be optional to such a device, and, in some embodiments, a device will not include a matching network, an antenna, and a receiver.

FIG. 1 shows a NFC-enabled system with a reader device 100 (i.e., in reader/writer mode) and a card (tag) device 110. However, in general, device 100 can be any NFC-enabled device that uses the transmitter. Therefore, device 100 can be (a) a NFC-enabled device in reader/writer mode, or (b) a NFC-enabled device in card mode with ALM (active load modulation), or (c) a NFC-enabled device in peer-to-peer mode. Consequently, in some embodiments, device 100 is a NFC-enabled device in reader/writer mode, while the communication counterpart device 110 is a NFC-enabled device in card mode (or simply a tag device). In some embodiments, device 100 is a NFC-enabled device in card mode with ALM (active load modulation), while the communication counterpart device 110 is a NFC-enabled device in reader/writer mode. In some embodiments, device 100 is a NFC-enabled device in peer-to-peer mode, while the communication counterpart device 110 is a second NFC-enabled device in peer-to-peer mode.

FIG. 1 depicts a NFC-enabled system together with the relevant signals, voltages, power at the respective nodes. In particular, FIG. 1 shows Tx output voltage 136, antenna voltage 126, radiated Tx power (shown as field strength H 182), and Rx input voltage 146 (which can be relevant in the loopback application). Please note that the Tx transmitted power (in the form of radiated Tx power) can be quantified as field-strength H with the unit A/m.

Some of the following Tx outputs are not shown in FIG. 1, but in some embodiments, control of the Tx output with enhanced accuracy is achieved with reference to one or more of the following: (a) a Tx power that is radiated from the device, (b) a Tx field strength that is radiated from the device, (c) a Tx output voltage that is fed to the matching network, (d) a voltage on any node in the matching network, (e) an antenna voltage, (f) a Rx input voltage. In general, the Tx output can be: (a) a Tx output power level, (b) a Tx output voltage level, (c) a Tx output current level. Furthermore, the Tx output can be measured from any possible nodes within device 100 that is after the output of the Tx and before the input of Rx. The possible node locations also include the radiated field between device 100 and communication counterpart device 110.

For both use cases (i.e., (1) accurate Tx power and (2) loopback), the Tx outputs (such as Tx output power and Tx output voltage) are strongly impacted by any variation in the different components of a DUT (device under test), as well as, very importantly, any variation in the matching network. Therefore, a calibrated Tx driver can compensate for any variations in the different components of a DUT and the matching network.

Figure 4:
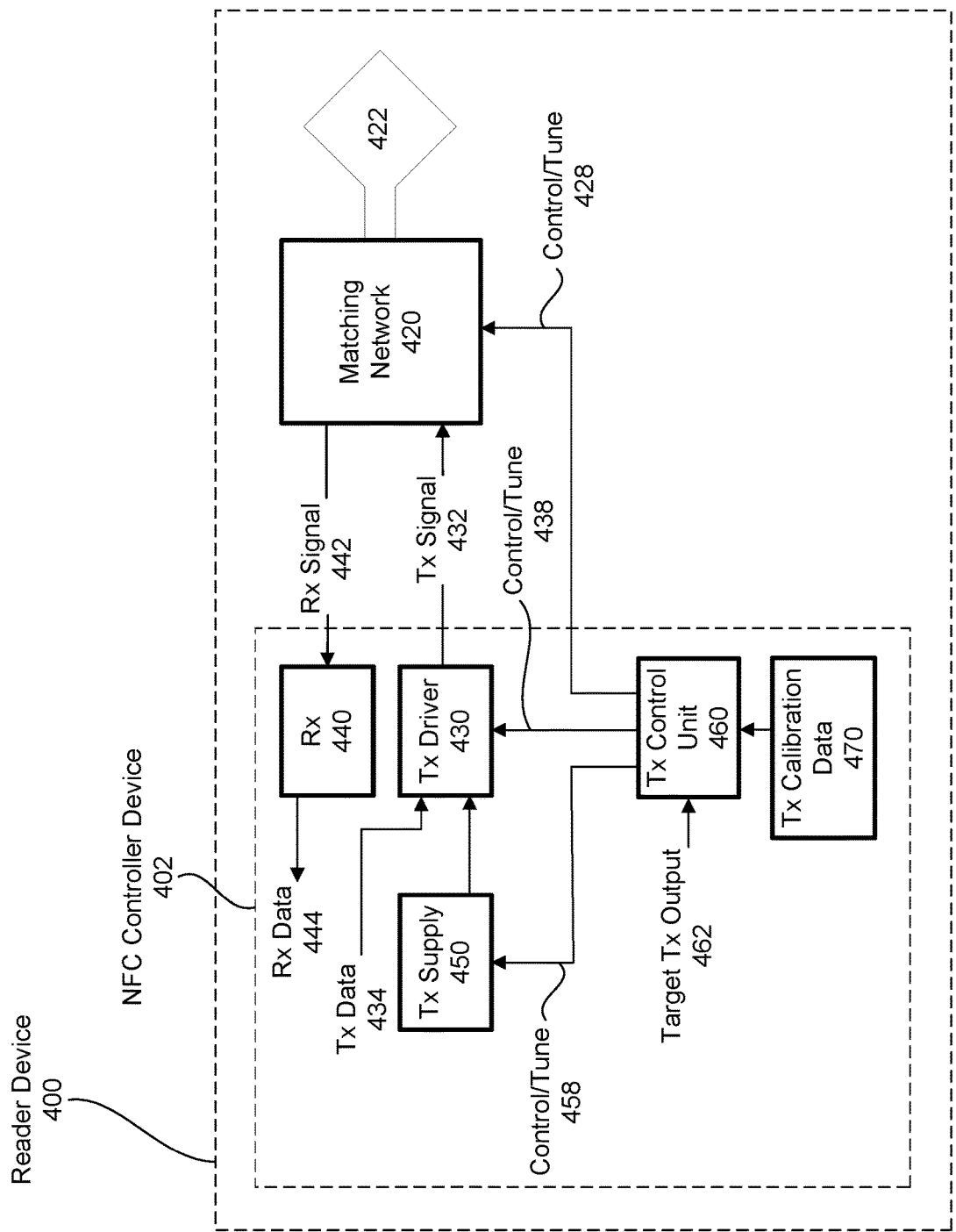
FIG. 4 shows a functional block diagram of a reader device with a Tx (transmitter) control unit that controls the Tx output by controlling/tuning the tunable elements (i.e., Tx supply, Tx driver, matching network) in accordance with some embodiments of the invention.

In some embodiments, the key point of this disclosure is to do a device level and/or a system level calibration of the Tx (transmitter) by testing at the device level and/or the system level. Then using the testing results to generate a set of Tx calibration data, which will be used by a Tx control unit to control a Tx output (such as a Tx output power, a Tx output voltage, a Tx output current, etc.). In some embodiments, a device level calibration can include testing and calibrating at the IC (integrated circuit) die level up to testing and calibrating at the device level (where the device can be a NFC controller device 402 or a reader device 400 as shown in FIG. 4, or the device can be a reader device 400 as shown in FIG. 4 minus the receiver, matching network, and antenna). In some embodiments, a system level calibration can include testing and calibrating at the device level up to testing and calibrating at the system level (where the system can be "a reader device 100" or "a reader device 100 plus a card device 110" as shown in FIG. 1).

Figure 2:
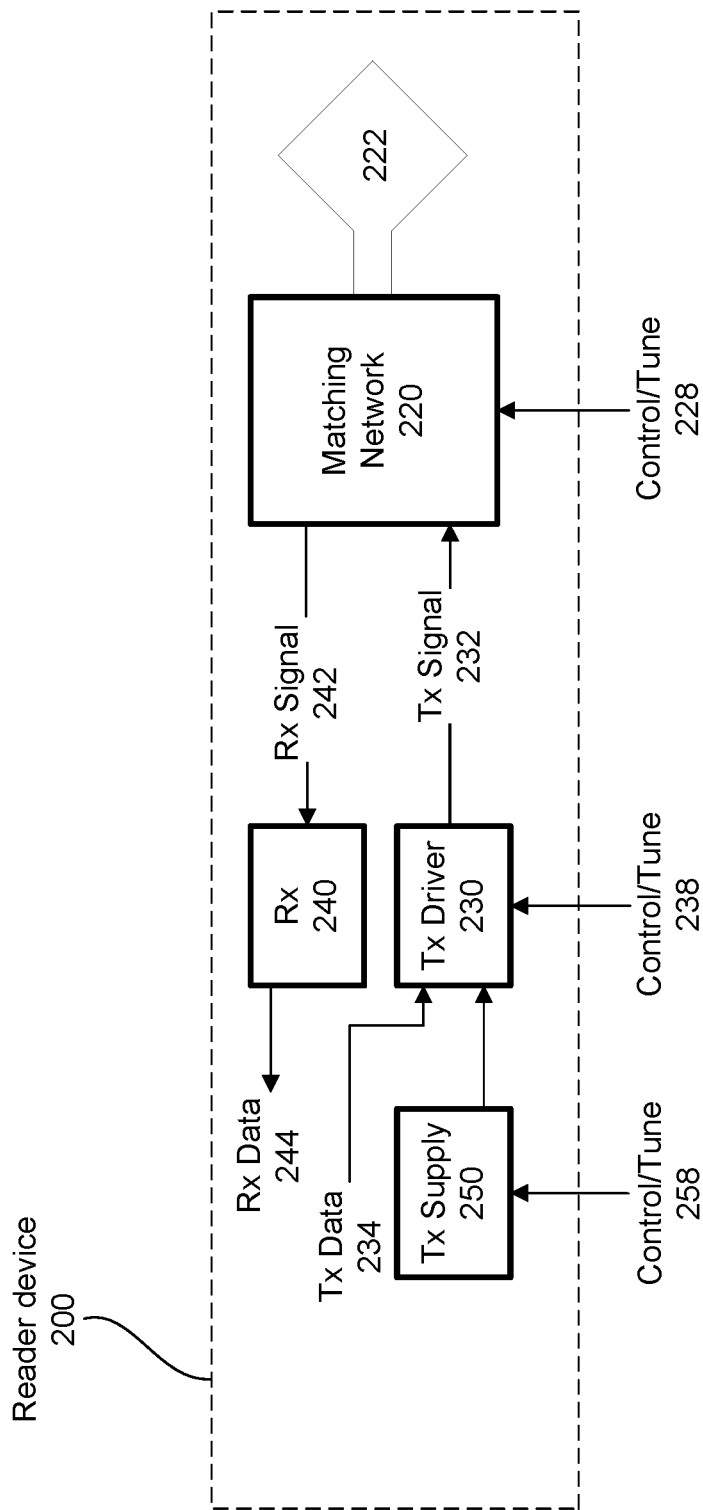
FIG. 2 shows a functional block diagram of a Tx (transmitter) calibration system with tunable elements (i.e., Tx supply, Tx driver, matching network) in accordance with some embodiments of the invention.

FIG. 2 shows a functional block diagram of a Tx (transmitter) calibration system with tunable elements (i.e., Tx supply, Tx driver, matching network) in accordance with some embodiments of the invention. In FIG. 2, a reader device 200 is shown to include a Tx (transmitter) driver 230, a Tx supply 250, a Rx (receiver) 240, a matching network 220, and an antenna 222. In general, a reader device can include a Tx (transmitter) unit (which can further include a Tx driver, Tx supply, etc.), a Rx (receiver) unit, a matching network, and an antenna. In FIG. 2, the Tx supply 250 provides a voltage to the Tx driver 230. FIG. 2 shows that the Tx driver 230 receives Tx data 234 as input, and then transmits Tx signal 232 as output. FIG. 2 also shows that the Rx 240 receives Rx data 242 as input, and then transmits Rx data 244 as output.

FIG. 2 shows that the reader device 200 can control the Tx output with enhanced accuracy by using the Tx calibration data to tune the Tx supply 250, the Tx driver 230, and the matching network 220. Control/tune 258 is applied to Tx supply 250, while control/tune 238 is applied to Tx driver 230 and control/tune 228 is applied to matching network 220. In some embodiments, tuning can be applied to all three functional blocks of device 200 (i.e., Tx supply 250, Tx driver 230, and matching network 220) to control the Tx output with enhanced accuracy. In some embodiments, tuning can be applied to only one of three functional blocks of device 200 (i.e., Tx supply 250, Tx driver 230, and matching network 220) to control the Tx output with enhanced accuracy. In some embodiments, tuning can be applied to any combination of the three functional blocks of device 200 (i.e., Tx supply 250, Tx driver 230, and matching network 220) to control the Tx output with enhanced accuracy.

Figure 3:
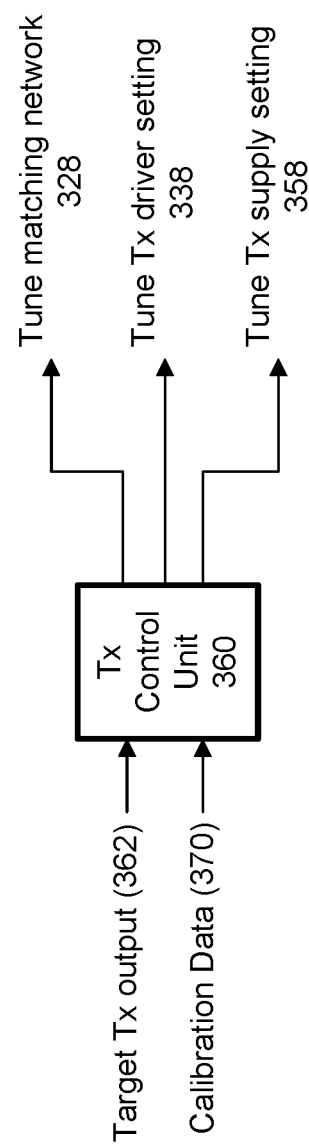
FIG. 3 shows a functional block diagram of a Tx (transmitter) control unit that controls the Tx output by controlling/tuning the tunable elements (i.e., Tx supply, Tx driver, matching network) in accordance with some embodiments of the invention.

FIG. 3 shows a functional block diagram of a Tx (transmitter) control unit that controls the Tx output by controlling/tuning the tunable elements (i.e., Tx supply, Tx driver, matching network) in accordance with some embodiments of the invention. FIG. 3 provides information on how a device can use calibration data to tune a Tx supply, a Tx driver, and a matching network. In particular, FIG. 3 shows that a desired target Tx output 362 and calibration data 370 are provided as inputs to Tx control unit 360. Then the Tx control unit 360 use these inputs to determine the tuning setting to send to the tunable elements (i.e., Tx supply, Tx driver, matching network). The tuning setting 358 is used to tune the Tx supply, while the tuning setting 338 is used to tune the Tx driver and the tuning setting 328 is used to tune the matching network.

FIG. 4 provides details on how a device can use calibration data to tune a Tx supply, a Tx driver, and a matching network. In particular, FIG. 4 shows a functional block diagram of a reader device 400 with a Tx (transmitter) control unit 460 that controls the Tx output by controlling/tuning the tunable elements (i.e., Tx supply 450, Tx driver 430, matching network 420) in accordance with some embodiments of the invention.

In FIG. 4, a reader device 400 is shown to include a NFC controller device 402, a matching network 420, and an antenna 422. The NFC controller device 402 is shown to include a Tx (transmitter) driver 430, a Tx supply 450, a Rx (receiver) 440, a Tx controller unit 460, and Tx Calibration data 470.

In FIG. 4, the Tx supply 450 provides an input to the Tx driver 430. FIG. 4 shows that the Tx driver 430 receives Tx data 434 as input, and then transmits Tx signal 432 as output to the matching network 420 and the antenna 422. FIG. 4 also shows that the Rx 440 receives Rx data 442 as input from the matching network 420 and the antenna 422, and in turn transmits Rx data 444 as output.

FIG. 4 further shows that a desired target Tx output 462 and calibration data 470 are provided as inputs to Tx control unit 460. Then the Tx control unit 460 uses these inputs to determine the tuning setting to send to the tunable elements (i.e., Tx supply 450, Tx driver 430, matching network 420). The tuning setting 458 is used to tune the Tx supply 450, while the tuning setting 438 is used to tune the Tx driver 430 and the tuning setting 428 is used to tune the matching network 420.

In some embodiments, (a) the Tx unit is comprised of: (i) a Tx supply, (ii) a Tx driver, (b) wherein the Tx control unit controls the Tx output with enhanced accuracy by using the Tx calibration data to tune one or more of the following: (i) the Tx supply, (ii) the Tx driver, (iii) the matching network.

In some embodiments, the device level and/or system level calibration of the Tx is achieved by controlling (and tuning) the Tx output to an accurate (target) level by utilizing one or more of the following tuning methods:

(a). changing the setting of the Tx driver supply (e.g., changing the voltage setting of the Tx driver supply),
(b). tuning the pulse modulation of the Tx driver (e.g., changing the pulse width),
(c). tuning the impedance (Tx Rdson) of the Tx driver transistors,
(d). tuning the driver biasing,
(e). tuning the matching network,
(f). etc.

In some embodiments, (a) the Tx unit is comprised of: (i) a Tx supply, (ii) a Tx driver, (b) wherein the Tx control unit controls the Tx output with enhanced accuracy by using the Tx calibration data to tune one or more of the following: (i) tuning a setting of the Tx supply, (ii) tuning a pulse modulation of the Tx driver, (iii) tuning an impedance of Tx driver transistors, (iv) tuning a biasing of the Tx driver, (v) tuning a number of drivers turned on, (vi) tuning the matching network.

In some embodiments, tuning a setting of the Tx driver supply can include changing the voltage setting of the Tx driver supply.

In some embodiments, pulse modulation can include PWM (pulse width modulation), PFM (pulse frequency modulation), PCM (pulse code modulation), PDM (pulse duration modulation), PAM (pulse amplitude modulation), PPM (pulse position modulation), etc. In some embodiments, tuning a pulse modulation of the Tx driver can include changing a pulse modulation of the Tx driver. In some embodiments, tuning a pulse modulation of the Tx driver can include changing a pulse width of the Tx driver.

In some embodiments, tuning an impedance of Tx driver transistors can include turn on and off Tx driver transistors.

In some embodiments, tuning a biasing of the Tx driver can include changing a voltage or a current to determine an operating point of a transistor circuit.

In some embodiments, the matching network can include resistive and reactive impedance. In some embodiments, the matching network can include resistor, capacitor, and inductor. In some embodiments, tuning the matching network can include changing an impedance setting of the matching network. In some embodiments, tuning the matching network can include changing a variable capacitor of the matching network.

In turn, the accuracy on the Tx output (such as Tx output power) may be achieved in reference to a radiated Tx output power, an antenna voltage, or a voltage on any node in the matching network. In some embodiments, control of the Tx output with enhanced accuracy is achieved with reference to one or more of the following: (a) a Tx power that is radiated from the device, (b) a Tx field strength that is radiated from the device, (c) a Tx output voltage that is fed to the matching network, (d) a voltage on any node in the matching network, (e) an antenna voltage, (f) a Rx input voltage.

The Tx control unit can be a hardware and/or software unit that allows compensation to be applied on a desired (target) configuration to achieve correction for a highly accurate Tx power. In some embodiments, the Tx control unit is one of the following: (a) a hardware functional block, (b) a software functional block, (c) a functional block comprising both hardware and software.

The control of the Tx output power using calibration data is performed by a control mechanism to apply correction data to a desired configuration. In turn an offset to the (desired) control can be generated.

The calibration data in need for the compensation and/or calibration as mentioned earlier need to be captured and stored. Different methods (as described below) are possible:

(a). Calibration data stored as configuration datasets to be applied to achieve specific target output power per available desired output power settings in a table (e.g., a look-up table).
(b). Calibration data stored as configuration datasets to be applied to achieve specific target output power per available desired output power settings in a function.
(c). Calibration data stored as "full or partial" and "absolute or offset" configuration datasets to be applied to achieve specific target output power per available desired output power settings in a table (e.g., a look-up table).
(d). Calibration data stored as "full or partial" and "absolute or offset" configuration datasets to be applied to achieve specific target output power per available desired output power settings in a function.
(e). Other methods are also possible.

For the above, "full or partial" configuration datasets mean that the configuration datasets can include a "full" table or a "partial" table. For a "full" table, all the available desired output power settings can be listed, while, for a "partial" table, only some of the available desired output power settings are listed. This means that for a "partial" table, in some embodiments, interpolation can be used to determine the desired output power settings that are not available.

For the above, "absolute or offset" configuration datasets mean that the configuration datasets can include "absolute" values or "offset" values to apply. For example, an "absolute" configuration dataset can provide absolute voltage values to apply, while an "offset" configuration dataset can provide offsets from a reference voltage value to apply.

In some embodiments, the Tx calibration data can be stored as one of the following: (a) a plurality of configuration parameter datasets to be applied to the device to achieve specific Tx output per available Tx output settings in a table, (b) a plurality of configuration parameter datasets to be applied to the device to achieve specific Tx output per available Tx output settings in a function.

In some embodiments, each configuration parameter dataset can be comprised of one or more of the following parameters: (a) Tx supply voltage, (b) pulse modulation of a Tx signal, (c) Tx impedance, (d) number of Tx drivers turned on, (e) impedance setting of the matching network.

In some embodiments, the Tx control unit can be implemented as one of the following: (a) a look-up table comprising the Tx calibration data, (b) a function comprising the Tx calibration data, (c) a combination of a look-up table and a function, the combination comprising the Tx calibration data.

FIG. 5A shows an example look-up table 500A comprising Tx (transmitter) calibration data (i.e., parameter settings) that can be used to help control a target Tx output (e.g., a target Tx output power) with enhanced accuracy in accordance with some embodiments of the invention. FIG. 5A shows that a desired target Tx output power can be achieved by tuning these 3 parameters: a Tx supply HW (hardware) configuration, a PWM (pulse width modulation) %, and a Num Driver setting. Each Tx supply HW configuration setting corresponds to a Tx supply voltage, which can be found by using the linking table 500C from FIG. 5C. In PWM, pulsing signals can be used with a duty cycle. Here the PWM % can be representing a scaling to the maximum power possible with PWM tuning, so that a higher PWM % represents a higher Tx power. (Note: PWM %=100 can represent the maximum power possible with PWM tuning.) The Num Driver setting can be representing how many Tx drivers in parallel are used. In the look-up table 500A, only 2 Tx drivers in parallel can be used, so Num Driver can be either 1 or 2, which represents 1 or 2 Tx driver(s) in parallel used.

To understand look-up table 500A, take, for example, the first row entry, where the desired target Tx output power is 0.3 mW. Here, to achieve a desired target Tx output power of 0.3 mW, then a Tx supply HW configuration setting of 0, a PWM of 10%, and a Num Driver setting of 1 should be used. To understand the Tx supply HW configuration setting of 0, we go to the linking table 500C from FIG. 5C, where the Tx supply HW configuration setting of 0 corresponds to a Tx supply voltage of 1 volt. As another example, look at the 13th row entry of 56.3 mW. Here, to achieve a desired target Tx output power of 56.3 mW, then a Tx supply HW configuration setting of 8, a PWM of 50%, and a Num Driver setting of 1 should be used. Here, the linking table 500C from FIG. 5C shows that the Tx supply HW configuration setting of 8 corresponds to a Tx supply voltage of 3 volt.

FIG. 5B shows an example generic look-up table 500B comprising Tx (transmitter) calibration data (i.e., parameter settings) that can help control a target Tx output (e.g., a target Tx output power) with enhanced accuracy in accordance with some embodiments of the invention. Similar to FIG. 5A, FIG. 5B shows that a desired target Tx output power can be achieved by tuning these 3 parameters: a Tx supply HW (hardware) configuration, a PWM (pulse width modulation) %, and a Num Driver setting.

Table 500B is a generic correction table. During calibration, the settings are filled with a combination of settings for the Tx supply HW configuration (based on the Tx supply voltage), PWM %, and Num Driver to achieve the target Tx power. If done in production, any variance from IC (integrated circuit), matching network, antenna is covered in the settings. (Note: IC includes the tunable elements (i.e., Tx supply, Tx driver, etc.) of the device.) During the use-case of "accurate Tx power", the input is the "Target Tx Power" as index into the LUT (look-up table), which provides the combination of settings to achieve the target Tx power with high accuracy.

FIG. 5C shows an example linking table 500C, which links Tx supply hardware configuration setting with actual Tx supply voltage, in accordance with some embodiments of the invention. The use of linking table 500C has already been explained earlier in this disclosure.

Figure 6:
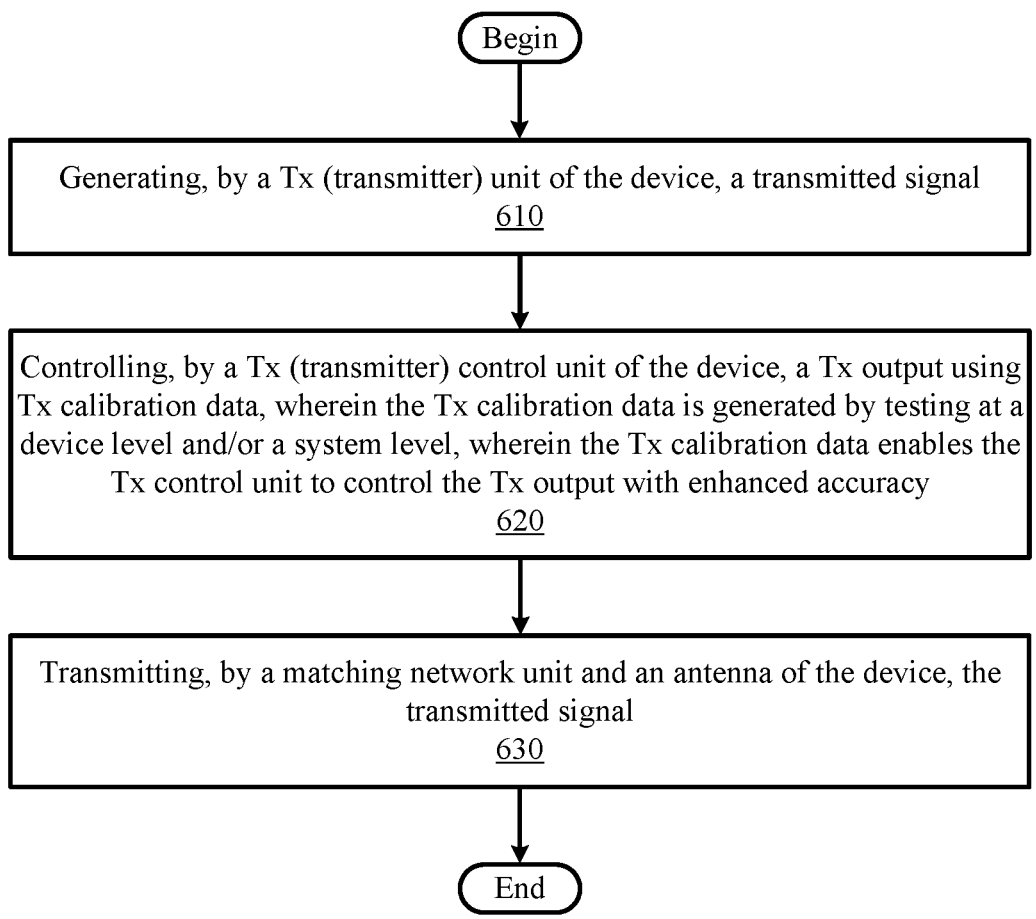
FIG. 6 shows a process flow diagram of a method for controlling a Tx (transmitter) output with enhanced accuracy by using Tx calibration data together with a Tx control unit in accordance with some embodiments of the invention.

FIG. 6 shows a process flow diagram of a method for controlling a Tx (transmitter) output with enhanced accuracy by using Tx calibration data together with a Tx control unit in accordance with some embodiments of the invention. As shown in FIG. 6, the method 600 begins at step 610, where the method generates, by a Tx (transmitter) unit of the device, a transmitted signal. Then, the method proceeds to step 620. In step 620, the method controls, by a Tx (transmitter) control unit of the device, a Tx output using Tx calibration data, wherein the Tx calibration data is generated by testing at a device level and/or a system level, wherein the Tx calibration data enables the Tx control unit to control the Tx output with enhanced accuracy. Finally, at step 630, the method transmits, by a matching network unit and an antenna of the device, the transmitted signal.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Examples of optical discs include a compact disc with read only memory (CD-ROM), a compact disc with read/write (CD-R/W), a digital video disc (DVD), and a Blu-ray disc.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A device that communicates via inductive coupling, the device comprising:
   a matching network;
   an antenna;
   a transmitter (Tx) unit, including a radio frequency transmitter, the Tx unit configured to generate a transmit signal that is transmitted through the matching network and the antenna;
   a Tx control unit including circuitry that stores a look-up table having a plurality of calibration data sets, the Tx control unit configured to:
      receive an indication of a target Tx output,
      determine a first calibration data set associated with the target Tx output from the look-up table and based on the indication of the target Tx output, wherein the plurality of calibration data sets are generated during testing at a device level, and each of the plurality of calibration data sets is associated with a different target Tx output and a plurality of settings of components of the Tx unit associated with the different target Tx output; and output at least one control signal based on the first calibration data set to control at least one setting of a component of the Tx unit of the plurality of settings of the components, wherein the at least one setting is configured to tune the Tx unit to generate the target Tx output;

wherein the target Tx output is associated with a target Tx output power level, and the plurality of settings of components of the Tx unit, for each of the plurality of calibration data sets, includes one of or a combination from among: a supply voltage setting of the Tx unit, a pulse modulation setting of the Tx unit, and a control setting that indicates a number of drivers of a Tx driver of the Tx unit to use.

2. The device of claim 1, wherein the plurality of settings of components of the Tx unit, for each of the plurality of calibration data sets, includes:

the supply voltage setting of the Tx unit, the pulse modulation setting of the Tx unit, and the control setting that indicates a number of drivers of a Tx driver of the Tx unit to use.

3. The device of claim 1, wherein the target Tx output is a target Tx output voltage level, wherein each of the plurality of calibration data sets include a Tx supply voltage, pulse modulation of a Tx signal, Tx impedance, number of Tx drivers turned on, and an impedance setting of the matching network.

4. The device of claim 1, wherein the target Tx output is a target Tx output current level, and the Tx control unit is configured to output the at least one control signal based on the first calibration data set to control at least one setting of a plurality of components of the Tx unit.

5. The device of claim 1 further comprising:
a receiver (Rx) unit, including a radio frequency receiver, the Rx unit configured to receive a signal from a counterpart device.

6. The device of claim 5,
wherein the device is an near field communication (NFC)-enabled device operating in one of the following modes:
reader/writer mode,
card mode with active load modulation,
peer-to-peer mode.

7. The device of claim 1,
wherein the Tx unit is comprised of:
a Tx supply and a Tx driver, the Tx supply to provide a voltage to the Tx driver and the Tx driver to receive Tx data and the voltage as inputs and transmit the Tx data as an output, and
wherein the at least one setting comprises a changed voltage setting of the Tx supply.

8. The device of claim 1,
wherein the Tx unit is comprised of:
a Tx supply and a Tx driver, and
wherein the at least one setting comprises a changed pulse modulation setting of the Tx driver.

9. The device of claim 1, wherein
the Tx control unit is further configured to output another control signal to control at least one setting of the matching network, wherein the at least one setting comprises a changed impedance setting of the matching network.

10. The device of claim 1, wherein the target Tx output comprises one of the following:
a Tx power that is radiated from the antenna,
a Tx field strength that is radiated from the antenna,
a Tx output voltage that is fed to the matching network,
a voltage on any node in the matching network,
an antenna voltage, and
a receiver (Rx) input voltage that is provided by the matching network to an Rx unit of the device.

11. The device of claim 1, wherein each calibration data set comprises one or more of the following settings:
a supply voltage setting of the Tx unit,
a pulse modulation setting of the Tx unit,
an impedance setting of the Tx unit,
a control setting that indicates a number of drivers turned on, wherein the Tx unit includes a Tx driver comprising one or more drivers configured to be turned off and on by the control setting,
an impedance setting of the matching network, and
a variable capacitor setting of the matching network, wherein the matching network comprises a variable capacitor.

12. The device of claim 1,
wherein the Tx unit is comprised of:
a Tx supply and a Tx driver,
wherein the Tx driver comprises a plurality of transistors, and
wherein the at least one setting comprises a changed impedance setting of the plurality of transistors of the Tx driver.

13. The device of claim 1,
wherein the Tx unit is comprised of:
a Tx supply and a Tx driver,
wherein the Tx driver comprises a plurality of transistors, and
wherein the at least one setting comprises a changed bias setting of the plurality of transistors of the Tx driver.

14. The device of claim 13,
wherein the changed bias setting comprises one or more of a changed voltage setting or a changed current setting to change an operating point of the plurality of transistors of the Tx driver.

15. The device of claim 1,
wherein the Tx unit is comprised of:
a Tx supply and a Tx driver,
wherein the Tx driver comprises a set of one or more drivers, each driver configured to receive a respective control setting to be turned off and on, and
wherein the at least one setting comprises at least one changed control setting of the one or more drivers of the Tx driver.

16. The device of claim 1, wherein
the Tx control unit is further configured to output another control signal to control at least one setting of the matching network, wherein the at least one setting comprises a changed variable capacitor setting of a capacitor within the matching network.

17. A method for operating a device that communicates via inductive coupling, the method comprising:
generating, by a transmitter (Tx) unit of the device, a transmit signal, the Tx unit including a radio frequency Tx;
receiving, by a Tx control unit of the device, an indication of a target Tx output, the Tx control unit including circuitry that stores a look-up table having a plurality of calibration data sets,
determining a first calibration data set associated with the target Tx output from the look-up table and based on the indication of the target Tx output, wherein the plurality of calibration data sets is generated during testing at a device level, and each of the plurality of calibration data sets is associated with a different target Tx output and a plurality of settings of a component of the Tx unit associated with the different target Tx output, and outputting at least one control signal based on the first calibration data set to control at least one setting of the component of the Tx unit of the plurality of settings of the component, wherein the at least one setting is configured to tune the Tx unit to generate the target Tx output;

wherein the target Tx output is associated with a target Tx output power level, and the plurality of settings of components of the Tx unit, for each of the plurality of calibration data sets, includes one of or a combination from among: a supply voltage setting of the Tx unit, a pulse modulation setting of the Tx unit, and a control setting that indicates a number of drivers of a Tx driver of the Tx unit to use.

18. The method of claim 17, wherein the target Tx output is one of the following:
a target Tx output power level,
a target Tx output voltage level,
a target Tx output current level.

19. The method of claim 17,
wherein the Tx unit is comprised of:
a Tx supply and a Tx driver, and
wherein the at least one setting comprises a changed voltage setting of the Tx supply.

20. The method of claim 17,
wherein the Tx unit is comprised of:
a Tx supply and a Tx driver, and
wherein the at least one setting comprises a changed pulse modulation setting of the Tx driver.

* * * * *